US009720678B2

(12) United States Patent
Pan et al.

(10) Patent No.: US 9,720,678 B2
(45) Date of Patent: Aug. 1, 2017

(54) NETWORK SWITCHING METHOD, VERSION UPGRADE METHOD, AND TERMINAL DEVICE

(71) Applicant: Huawei Technologies Co., Ltd., Shenzhen (CN)

(72) Inventors: Shilin Pan, Shanghai (CN); Yonghong Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 14/261,151

(22) Filed: Apr. 24, 2014

(65) Prior Publication Data

US 2014/0325043 A1 Oct. 30, 2014

(30) Foreign Application Priority Data

Apr. 28, 2013 (CN) .......................... 2013 1 0155790

(51) Int. Cl.
G06F 9/445 (2006.01)
H04L 29/08 (2006.01)

(52) U.S. Cl.
CPC ................ *G06F 8/65* (2013.01); *H04L 67/34* (2013.01)

(58) Field of Classification Search
CPC ....... H04L 41/082; H04L 67/34; H04L 12/24; G06F 8/65; G06F 9/445
USPC .......................................................... 709/221
See application file for complete search history.

(56) References Cited

U.S. PATENT DOCUMENTS

| 5,793,966 | A | * | 8/1998 | Amstein | ............. | G06F 17/3089 |
| | | | | | | 707/E17.116 |
| 2002/0199044 | A1 | | 12/2002 | Futterman | | |
| 2005/0037746 | A1 | * | 2/2005 | Ramalho | ............... | H04W 88/06 |
| | | | | | | 455/422.1 |
| 2006/0184554 | A1 | * | 8/2006 | Albert | ............... | G06F 17/30265 |
| 2007/0050321 | A1 | * | 3/2007 | Albert | ............... | G06F 17/30244 |

(Continued)

FOREIGN PATENT DOCUMENTS

| CN | 102289395 A | 12/2011 |
| CN | 102414661 A | 4/2012 |

OTHER PUBLICATIONS

Forensics Wiki, "Category:Forensics File Formats," URL: "http://www.forensicswiki.org/wiki/Category:Forensics_File_Formats," Jul. 2008.*

*Primary Examiner* — Kevin Bates
*Assistant Examiner* — Chen-Liang Huang
(74) *Attorney, Agent, or Firm* — Slater Matsil, LLP

(57) ABSTRACT

Embodiments of the present invention disclose a network switching method, a version upgrade method, and a terminal device, which relate to the field of communications technologies. A terminal receives a user instruction that instructs the terminal to access a network of a target operator. If an operator of a network currently accessed by the terminal is different from the target operator, a preset file is read to obtain image information corresponding to the target operator. A target image file corresponding to the target operator is obtained according to the image information and version switching is performed according to the target image file. The preset file includes image information that corresponds to all image files of operators stored in the terminal in one-to-one correspondence.

16 Claims, 4 Drawing Sheets

(56) References Cited

U.S. PATENT DOCUMENTS

| | | | | |
|---|---|---|---|---|
| 2007/0283080 A1* | 12/2007 | Bolanowski | ............. | G06F 8/65 |
| | | | | 711/103 |
| 2009/0047964 A1* | 2/2009 | Krishnaswamy | ..... | H04W 12/04 |
| | | | | 455/438 |
| 2010/0202450 A1* | 8/2010 | Ansari | ................... | G06Q 30/04 |
| | | | | 370/389 |
| 2010/0274930 A1* | 10/2010 | Thakkar | ............. | H04W 36/385 |
| | | | | 710/8 |

* cited by examiner

NETWORK SWITCHING METHOD, VERSION UPGRADE METHOD, AND TERMINAL DEVICE

CROSS-REFERENCE TO RELATED APPLICATION

This application claims priority to Chinese Patent Application No. 201310155790.6, filed on Apr. 28, 2013, which is hereby incorporated by reference in its entirety.

TECHNICAL FIELD

The present invention relates to the field of communications technologies, and in particular, to a network switching method, a version upgrade method, and a terminal device.

BACKGROUND

A flash memory or other storage media of a terminal stores executable image files. Generally, only one group of image files, that is, one group of available versions, are stored in the terminal, where the versions are replaced during upgrade. However, an EM wireless network access module, which serves as a product pattern of the terminal, is generally integrated into a notebook computer and is used for 3G (3rd-generation, third generation mobile communication technology) network access of the notebook computer. Because a user who buys a notebook computer can freely select networks of a plurality of operators, the EM wireless network access module also needs to support access to the networks of a plurality of operators However, because different operators have different program requirements, when the user accesses an operator network, the user must have an admission test version of the operator to get authorized access to the operator network. Therefore, the EM wireless network access module with only one group of available versions cannot support access to the networks of a plurality of operators. Therefore, how to effectively store a plurality of operator versions and how to dynamically switch between versions and dynamically select a version have become issues that expect to be solved in this field.

SUMMARY

Embodiments of the present invention provide a network switching method, a version upgrade method, and a terminal device, which can effectively store versions of a plurality of operators and improve efficiency in identifying and switching an operator version.

To achieve the foregoing objective, the embodiments of the present invention use the following technical solution:

According to a first aspect, a network switching method is provided, including:

receiving, by a terminal, a user instruction, where the user instruction instructs the terminal to access a network of a target operator; and if an operator of a network currently accessed by the terminal is different from the target operator, reading a preset file to obtain image information corresponding to the target operator, obtaining, according to the image information, a target image file corresponding to the target operator, performing version switching according to the target image file, and switching to the network of the operator, where the preset file includes image information that corresponds to all image files of operators stored in the terminal in one-to-one correspondence.

In a first possible implementation manner, with reference to the first aspect, the image information includes operator information and configuration parameters;

the obtaining, according to the image information, a target image file corresponding to the target operator, performing version switching according to the target image file, and switching to the network of the operator includes:

selecting, from all the image files stored in the terminal, the target image file consistent with operator information of the target operator;

restarting the terminal and loading the target image file; and initializing, according to configuration parameters in the target image file, the terminal and registering with the network of the target operator.

In a second possible implementation manner, with reference to the first aspect, if the operator of the network currently accessed by the terminal is the same as the target operator, the network switching is stopped.

According to a second aspect, a version upgrade method is provided, including:

receiving, by a terminal, a first data packet, where the first data packet carries first image information;

reading, by the terminal, a preset file, and determining, according to the first image information carried by the first data packet, whether an image file stored in the terminal requires a version upgrade, where the preset file includes image information that corresponds to all image files of operators stored in the terminal in one-to-one correspondence; and if the version upgrade is required, receiving, by the terminal, remaining data packets until an image file corresponding to the first image information is received completely to finish the version upgrade, where the image file corresponding to the first image information is composed of the first data packet and the remaining data packets.

In a first possible implementation manner, with reference to the second aspect, the image information includes operator information and version information;

the determining, according to the first image information carried by the first data packet, whether an image file stored in the terminal requires a version upgrade includes:

if version information of the first image information is later than version information of second image information in the preset file, determining that the version upgrade is required, where the second image information is a piece of image information that is the same as operator information of the first image information and that is one of the image information that corresponds to all image files stored in the terminal in one-to-one correspondence; and otherwise, stopping the version upgrade.

In a second possible implementation manner, with reference to the second aspect or the first possible implementation manner, the first data packet is first 4K data of the image file corresponding to the first image information.

According to a third aspect, a terminal device is provided, including:

a receiving module, configured to receive a user instruction, where the user instruction instructs the terminal device to access a network of a target operator; and a switching module, configured to: if an operator of a network currently accessed by the terminal device is different from the target operator, read a preset file to obtain image information corresponding to the target operator, obtain, according to the image information, a target image file corresponding to the target operator, perform version switching according to the target image file, and switch to the network of the operator, where the preset file includes image information that corresponds to all image files of operators stored in the terminal device in one-to-one correspondence.

In a first possible implementation manner, with reference to the third aspect, the image information includes operator information and configuration parameters;

the switching module is specifically configured to: select, from all the image files stored in the terminal device, the target image file consistent with operator information of the target operator; restart the terminal device and load the target image file; and initialize, according to configuration parameters in the target image file, the terminal device and register with the network of the target operator.

In a second possible implementation manner, with reference to the third aspect, the switching module is further configured to stop the network switching if the operator of the network currently accessed by the terminal is the same as the target operator.

According to a fourth aspect, a terminal device is provided, including:

a receiving module, configured to receive a first data packet, where the first data packet carries first image information; and a processing module, configured to read a preset file, and determine, according to the first image information carried by the first data packet, whether an image file stored in the terminal device requires a version upgrade, where the preset file includes image information that corresponds to all image files of operators stored in the terminal in one-to-one correspondence;

where the processing module is further configured to: if the image file stored in the terminal requires a version upgrade, the receiving module receives remaining data packets until an image file corresponding to the first image information is received completely to finish the version upgrade, where the image file corresponding to the first image information is composed of the first data packet and the remaining data packets.

In a first possible implementation manner, with reference to the fourth aspect, the image information includes operator information and version information; and the processing module is specifically configured to: if version information of the first image information is later than version information of second image information in the preset file, determine that the image file stored in the terminal requires a version upgrade, where the second image information is a piece of image information that is the same as operator information of the first image information and that is one of the image information that corresponds to all image files stored in the terminal device in one-to-one correspondence; otherwise, stop the version upgrade In a second possible implementation manner, with reference to the fourth aspect or the first possible implementation manner, the first data packet is first 4K data of the image file corresponding to the first image information.

The embodiments of the present invention provide a network switching method, a version upgrade method, and a terminal device. A terminal receives a user instruction, and then determines, according to the user instruction, whether an operator of a currently accessed network is the same as a target operator in the user instruction; if the operator of the currently accessed network is the same as the target operator in the user instruction, the terminal obtains a target image file of the target operator from a preset file, and then performs version switching according to the target image file to access a target network according to the switched target image file. In this way, versions of a plurality of operators are stored effectively, and efficiency in identifying and switching an operator version is improved.

BRIEF DESCRIPTION OF DRAWING(S)

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
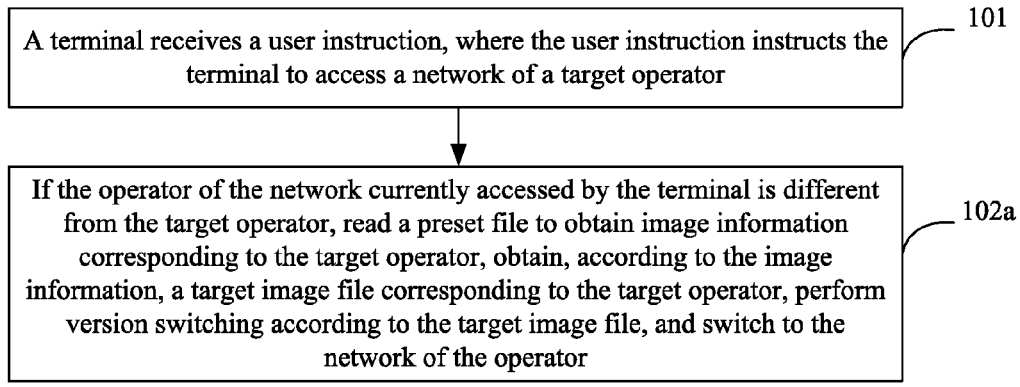
FIG. 1 is a schematic flowchart of a network switching method according to an embodiment of the present invention.

An embodiment of the present invention provides a network switching method. As shown in FIG. 1, the method includes the following steps:

101. A terminal receives a user instruction, where the user instruction instructs the terminal to access a network of a target operator.

Specifically, after receiving the user instruction, the terminal first needs to determine whether an operator of a currently accessed network is the same as the target operator in the user instruction. In this way, when the operator of the network currently accessed by the terminal is different from the target operator, step 102a is executed.

102a. If the operator of the network currently accessed by the terminal is different from the target operator, read a preset file to obtain image information corresponding to the target operator, obtain, according to the image information, a target image file corresponding to the target operator, perform version switching according to the target image file, and switch to the network of the operator.

The preset file includes image information that corresponds to all image files of operators stored in the terminal in one-to-one correspondence. Specifically, the preset file may store, in the form of directory and table, all the image files of operators and the image information that corresponds to all the image files of operators stored in the terminal in one-to-one correspondence, which helps the terminal subsequently find a target image file corresponding to the target operator according to the image information of the target operator.

The image information includes operator information and configuration parameters. Specifically, the foregoing operator information includes but is not limited to version numbers of operators, image types of all images in the image files of the operators, names of the operators, and code identifiers corresponding to the operators, while the foregoing configuration parameters may be data stored in a current NV item of a system and are used to initialize the terminal and register the terminal with a target network.

Figure 2:
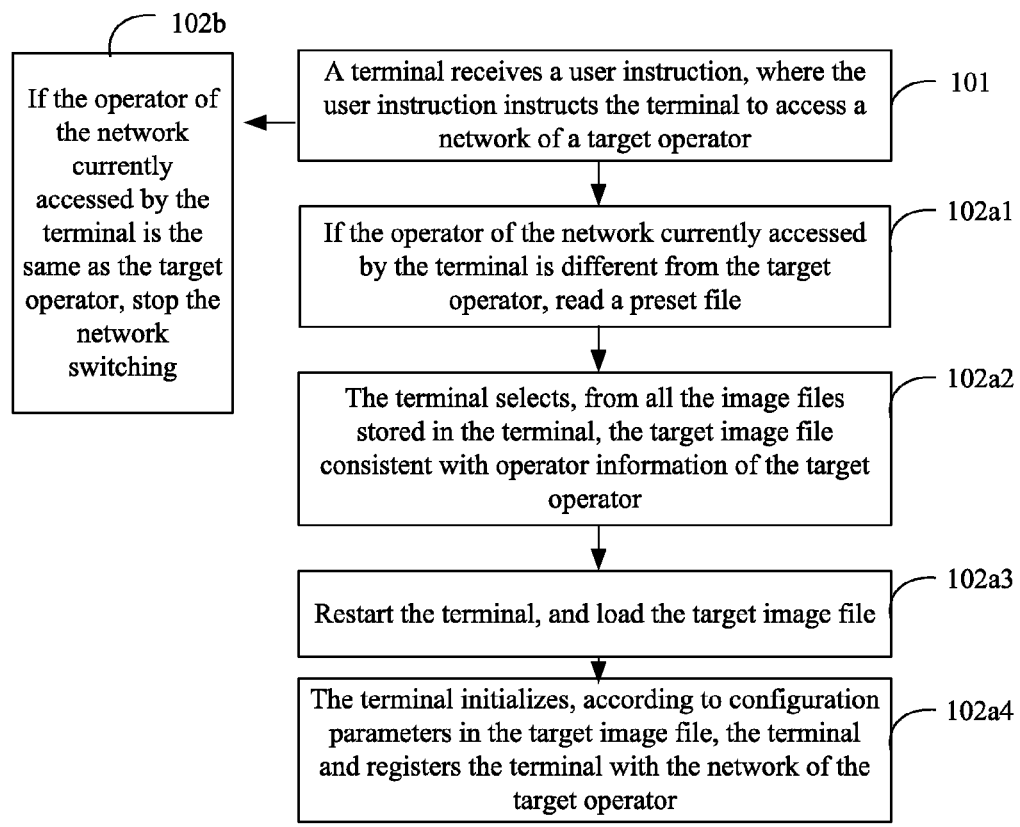
FIG. 2 is a schematic flowchart of another network switching method according to an embodiment of the present invention.

Optionally, as shown in FIG. 2, step 102a specifically includes the following steps:

102a1. If the operator of the network currently accessed by the terminal is different from the target operator, read the preset file.

102a2. The terminal selects, from all the image files stored in the terminal, the target image file consistent with operator information of the target operator.

102a3. Restart the terminal and load the target image file.

102a4. The terminal initializes, according to configuration parameters in the target image file, the terminal and registers with the network of the target operator.

Specifically, if the operator of the network currently accessed by the terminal is different from the target operator, it indicates that a current image file cannot be used; the terminal first needs to read the preset file, and selects the image information corresponding to the target operator, so that the terminal selects, according to the operator information in the image information, the target image file consistent with the target operator information from the terminal. Then, the terminal is restarted and the target image file is loaded, so that the terminal can initialize, according to configuration data of the operator of the target network, the terminal and register with the network of the target operator. In addition, the terminal finally initializes, according to the configuration parameters, the terminal and registers with the network of the target operator, where the network is selected from all networks of the target operator by the terminal according to an access standard supported by the terminal and the network is supported by the access standard.

As shown in FIG. 2, when the operator of the network currently accessed by the terminal is the same as the target operator, step 102b is executed.

102b. If the operator of the network currently accessed by the terminal is the same as the target operator, stop the network switching.

Specifically, when the terminal needs to connect to a network, the terminal first searches for currently available operators, so that a user selects a target operator from these found operators and instructs the terminal to switch to a network of the target operator. Certainly, if the operation of searching for operators by the terminal is a static operation, the terminal reports operators supported by the terminal to the user, and the user selects a target operator from the supported operators sent by the terminal to instruct the terminal to switch to the network of the target operator. In this case, if there is only one operator supported by the terminal, the operation of switching the image file is not performed, and the current network is switched to another network of the target operator still according to the current image file.

In addition, there is a form of storing image files of operators in the prior art, that is, multiple image partitions are reserved to store the image files of the operators, and each image partition stores image files of one operator. When this method is applied, if the number of image files of the operators added subsequently is greater than the number of reserved image partitions, files are lost. In addition, a certain space is reserved in each image partition to prevent bad blocks and for increased size of future versions, which causes a waste of space. However, in the present invention, the terminal stores all the image files of operators in preset information, and invokes an image file of an operator when the image file of the operator is needed. In this way, the loss of space reserved for bad block management is avoided and the size of image partitions does not need to be dynamically planned.

This embodiment of the present invention provides a network switching method. A terminal receives a user instruction, and then determines, according to the user instruction, whether an operator of a currently accessed network is the same as a target operator in the user instruction; if the operator of the currently accessed network is the same as the target operator in the user instruction, the terminal obtains a target image file of the target operator from a preset file, and then performs version switching according to the target image file to access a target network according to the switched target image file. In this way, versions of a plurality of operators are stored effectively, and efficiency in identifying and switching an operator version is improved.

Figure 3:
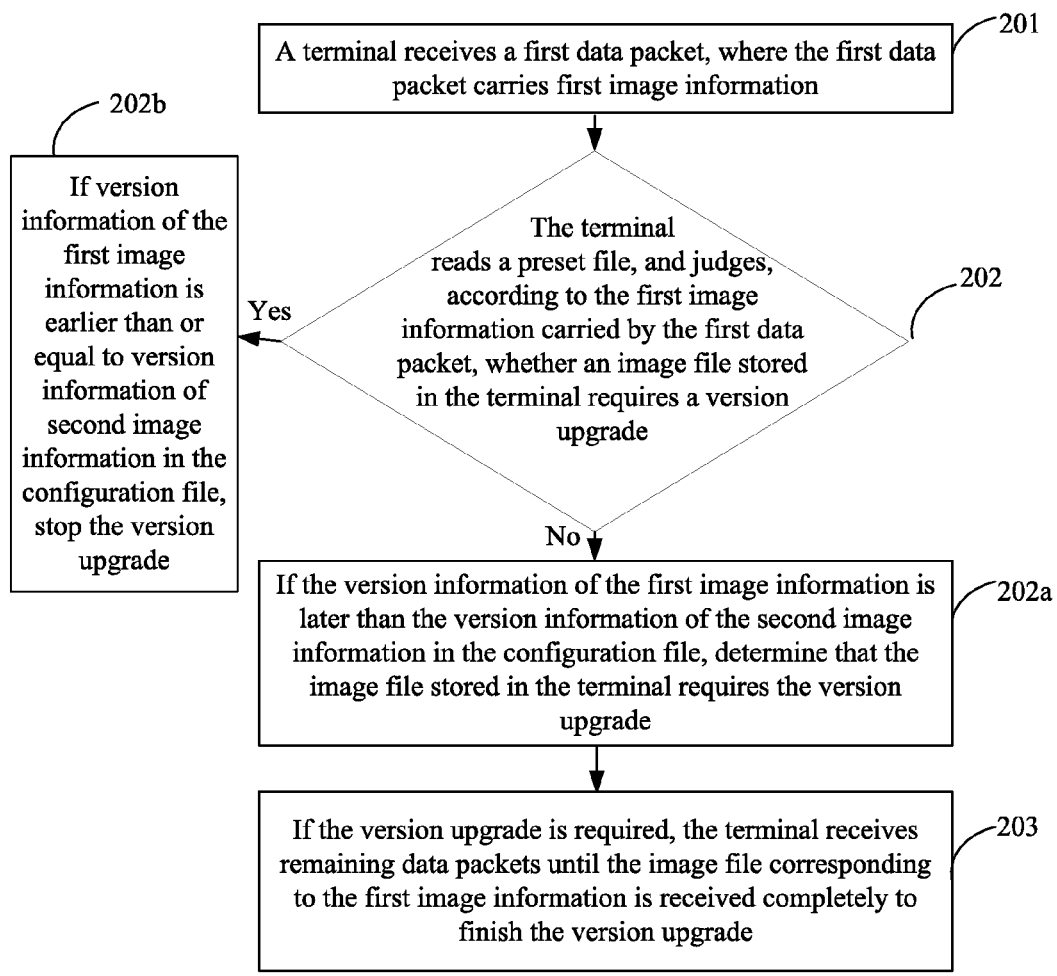
FIG. 3 is a schematic flowchart of a version upgrade method according to an embodiment of the present invention.

An embodiment of the present invention provides a version upgrade method. As shown in FIG. 3, the version upgrade method specifically includes the following steps:

201. A terminal receives a first data packet, where the first data packet carries first image information.

The foregoing first data packet is first 4K byte (byte) data of an image file corresponding to the first image information.

202. The terminal reads a preset file, and determines, according to the first image information carried by the first data packet, whether an image file stored in the terminal requires a version upgrade.

The preset file includes image information that corresponds to all image files of operators stored in the terminal in one-to-one correspondence, while the image information includes operator information and version information, where the version information includes but is not limited to version numbers of operators or image types of all images in the image files and the operator information includes names of the operators.

Optionally, step 202 specifically includes the following steps:

202a. If version information of the first image information is later than version information of second image information in the preset file, determine that the version upgrade is required.

The second image information is a piece of image information that is the same as operator information of the first image information and that is one of the image information that corresponds to all image files stored in the terminal in one-to-one correspondence.

202*b*. If the version information of the first image information is earlier than the version information of the second image information in the preset file, stop the version upgrade.

Specifically, the terminal matches a version number or an image type of an operator in the second image information in the preset file with a version number or an image type of an operator in the first image information in the first data packet, and determines whether the version information of the first image information is later than the version information of the second image information in the preset file; if the version information of the first image information is later, the upgrade is required; if the version information of the first image information is earlier, the upgrade is not required.

203. If the version upgrade is required, the terminal receives remaining data packets until the image file corresponding to the first image information is received completely to finish the version upgrade.

The image file corresponding to the first image information is composed of the first data packet and the remaining data packets. Specifically, after receiving the remaining data packets, the terminal stores the complete image file that corresponds to the first image information and that is composed of the first data packet and the remaining data packets at a position in the preset file in which an image file corresponding to the second image information is stored to replace the image file corresponding to the second image information.

It should be noted herein that the foregoing upgrade process is a method for upgrading image files of one operator in the image files of operators stored in the terminal, and methods for upgrading image files of other operators are the same as this method. In addition, when the terminal upgrades the image files of the operators, the terminal may upgrade the image files according to a sequence of directories or tables of the preset file in the terminal or freely select an operator for upgrading. The whole upgrade process is completed only when the image files of all the operators are upgraded.

By using the version upgrade method provided in this embodiment, OEM manufacturers can reuse their existing upgrade tools to package image version files of operators into an upgrade file of a file system, and upgrade the upgrade file in the system by using the same tools, which improves efficiency in upgrading image versions of a plurality of operators.

Figure 4:
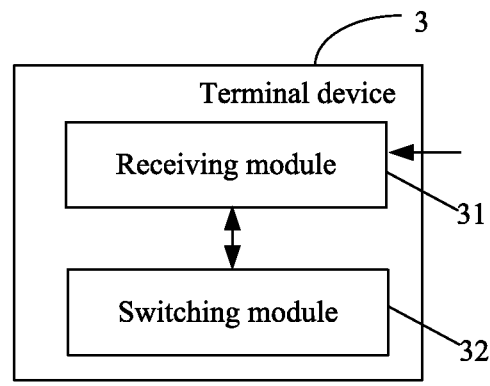
FIG. 4 is a schematic apparatus diagram of a terminal device according to an embodiment of the present invention.

An embodiment of the present invention provides a terminal device. As shown in FIG. 4, the terminal device includes a receiving module 31 and a switching module 32. When the terminal device provided in this embodiment of the present invention is a device that combines a terminal product board and a PC, specifically, the terminal product board is an electronic device that can be inserted into a subrack to provide various uplink or service ports, and the terminal product board is composed of a chip and electronic components. In this embodiment, partitions of a flash memory of the foregoing terminal mainly includes three areas: a boot program partition, an image partition, and a file management area. The file management area is managed by a file system, while the file system has functions such as equalized writing, power-off protection, and bad block management. Specifically, the boot program partition generally stores a boot program directly in a binary form; the image partition stores image files of an operator currently run by the terminal, and the file management area stores preset information, where the preset information may be a file that carries image files of all operators or may be a version directory that stores image files of all operators. In addition, upgrade tools in a current original equipment manufacturer (OEM) production line generally assume that only one image partition exists in the terminal product board. Therefore, in this embodiment, to upgrade different types of image version information of operators on a more quickly and efficiently, only one image partition is generally set.

In addition, before specific functions of each module of the terminal device are described, the following first describes how the terminal device implements the version upgrade method in the foregoing method embodiment. Specifically, after the terminal device (that is, the board) is powered on, the terminal device starts a boot program bootloader stored in the boot program partition, and then loads a default image file into the image partition for running. When the terminal device needs to connect to a network, the terminal device reads an image file of an operator of a current network stored in the image partition to obtain current available operator information, and then initializes, according to the current operator information, the terminal device and registers with the current network. In addition, when a user actively requires to scan networks, the terminal device first performs network searching, and then notifies a network search result to the user, so that the user selects a target operator from the network search result and notifies the target operator to the terminal device; after receiving a user instruction, the terminal device instructs the switching module 32 to find an image file of the target operator in the preset information stored in the system management area of the terminal device and replaces the image file of the operator of the current network stored in the image partition; finally, the switching module 32 switches to the network of the target operator according to an image file of an operator corresponding to a target network.

Specifically, specific implementation functions of each module of the terminal device are as follows:

The receiving module 31 is configured to receive a user instruction, where the user instruction instructs the terminal to access a network of a target operator.

The switching module 32 is configured to: if an operator of a network currently accessed by the terminal device is different from the target operator, read a preset file to obtain image information corresponding to the target operator, obtain, according to the image information, a target image file corresponding to the target operator, perform version switching according to the target image file, and switch to the network of the operator, where the preset file includes image information that corresponds to all image files of operators stored in the terminal device in one-to-one correspondence.

Optionally, the image information includes operator information and configuration parameters.

The switching module 32 is specifically configured to: select, from all the image files stored in the terminal, a target image file consistent with operator information of the target operator; restart the terminal device and load the target image file; initialize, according to configuration parameters in the target image file, the terminal device and register with the network of the target operator.

Alternatively, the switching module 32 is further configured to stop the network switching if the operator of the network currently accessed by the terminal device is the same as the target operator.

This embodiment of the present invention provides a terminal device. The terminal receives a user instruction, and then determines, according to the user instruction, whether an operator of a currently accessed network is the same as a target operator in the user instruction; if the operator of the currently accessed network is the same as the target operator in the user instruction, the terminal obtains a target image file of the target operator from a preset file, and then performs version switching according to the target image file to access a target network according to the switched target image file. In this way, versions of a plurality of operators are stored effectively, and efficiency in identifying and switching an operator version is improved.

Figure 5:
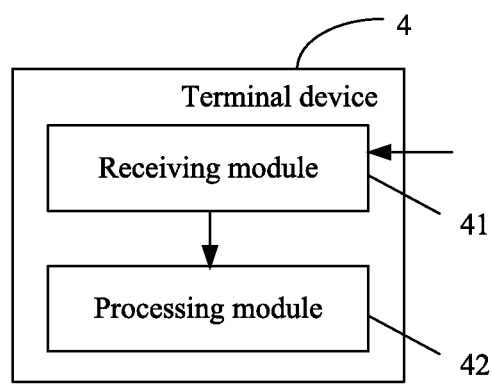
FIG. 5 is a schematic apparatus diagram of another terminal device according to an embodiment of the present invention.

An embodiment of the present invention provides a terminal device. As shown in FIG. 5, the terminal device is configured to implement the foregoing version upgrade method. The terminal device 4 includes a receiving module 41 and a processing module 42, where:

the receiving module 41 is configured to receive a first data packet, where the first data packet carries first image information; and the processing module 42 is configured to read a preset file, and determine, according to the first image information carried by the first data packet, whether an image file stored in the terminal device requires a version upgrade, where the preset file includes image information that corresponds to all image files of operators stored in the terminal in one-to-one correspondence;

where the processing module 42 is further configured to: if the version upgrade is required, the receiving module 41 receives remaining data packets until an image file corresponding to the first image information is received completely to finish the version upgrade, where the image file corresponding to the first image information is composed of the first data packet and the remaining data packets.

Optionally, the image information includes operator information and version information.

The processing module 42 is specifically configured to: if version information of the first image information is later than version information of second image information in the preset file, determine that the version upgrade is required, where the second image information is a piece of image information that is the same as operator information of the first image information and that is one of the image information that corresponds to all image files stored in the terminal device in one-to-one correspondence; otherwise, stop the version upgrade.

Optionally, the first data packet is first 4K data of the image file corresponding to the first image information.

The terminal device provided in this embodiment enables OEM manufacturers to reuse their existing upgrade tools to package image version files of operators into an upgrade file of a file system, and upgrade the upgrade file in the system by using the same tools, which improves efficiency in upgrading image versions of a plurality of operators.

Figure 6:
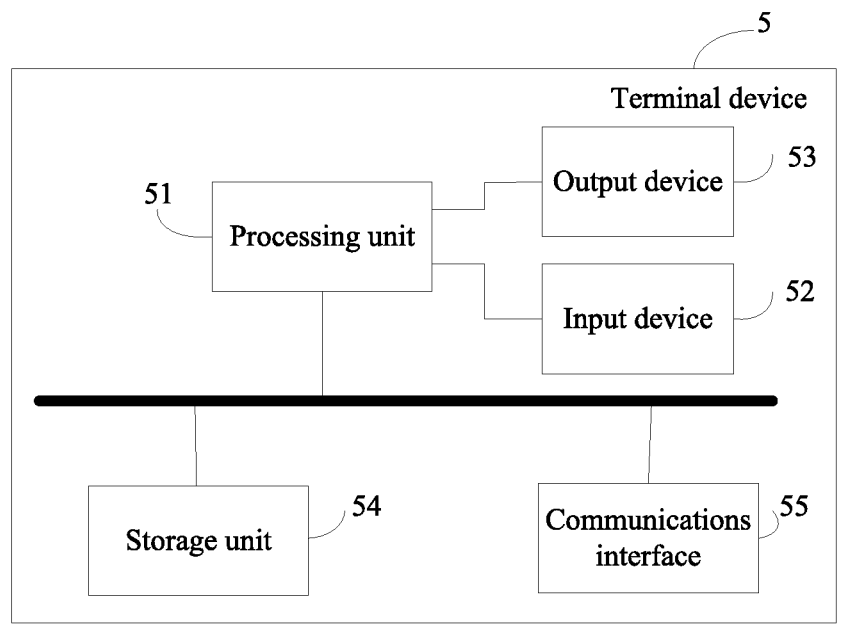
FIG. 6 is a schematic apparatus diagram of a terminal device according to another embodiment of the present invention.

FIG. 6 is a schematic structural diagram of a terminal device according to another embodiment of the present invention. The terminal device may be a terminal product board, that is, an electronic device that can be inserted into a subrack to provide various uplink or service ports; the terminal product board is composed of a chip and electronic components. The terminal device includes a processing unit 51, an input device 52, an output device 53, a storage device 54, and a communications interface 55, where all the components are coupled together by using a bus system. The bus may be an Industry Standard Architecture (Industry Standard Architecture, ISA for short) bus, a Peripheral Component Interconnect (PCI for short) bus or an Extended Industry Standard Architecture (EISA for short) bus, and the like. The bus may be classified into an address bus, a data bus, a control bus, and the like. For the convenience of representation, the bus in FIG. 6 is represented by using one piece of solid line only, but it does not mean that there is only one piece of bus or one type of bus. In FIG. 6:

The processing unit 51 may be a universal central processing unit (central procession unit, CPU for short), an application specific integrated circuit (ASIC for short), a digital signal processor (DSP), a field programmable gate array (FPGA) or other programmable logical devices. The input device and the output device can implement input and output by using a USB (Universal Serial BUS, universal serial bus).

The storage device 54 includes but is not limited to common storage media in this field like a read only memory (read only memory, ROM for short), a random access memory (random access memory, RAM for short), or a disk storage (disk storage), a flash memory, a programmable read only memory or an electrically erasable and programmable memory, and a register. The storage device 54 is configured to provide the processing unit 51 with an instruction and data information, and connect to the processing unit 51 by using the bus.

The storage device 54 stores program code of an operating system, an application, and so on that are used to implement this embodiment of the present invention. The operating system is configured to control and implement processing functions executed by the processing unit 51. The application includes the program code.

The program code used to implement this embodiment of the present invention is coupled with the processing unit 51 to implement the version switching method provided by this embodiment of the present invention.

The processing unit 51 further includes a communications interface 55, where the communications interface 55 is configured to connect to a terminal device and a user equipment, and the communications network includes an Ethernet, a radio access network (RAN), a wireless local area network (WLAN) or other similar networks. The processing unit 51 processes and transfers messages between all devices by reading information stored in the storage device 54 to: enable the terminal to receive a user instruction, where the user instruction instructs the terminal device to access a network of a target operator; if an operator of a network currently accessed by the terminal device is different from the target operator, read a preset file to obtain image information corresponding to the target operator, obtain, according to the image information, a target image file corresponding to the target operator, perform version switching according to the target image file, and switch to the network of the operator, where the preset file includes image information that corresponds to all image files of operators stored in the terminal device in one-to-one correspondence.

Optionally, the image information includes operator information and configuration parameters.

The processing unit 51 is further configured to: select, from all the image files stored in the terminal device, the target image file consistent with operator information of the target operator; restart the terminal device and load the target image file; and initialize, according to configuration parameters in the target image file, the terminal device and register with the network of the target operator.

Alternatively, the processing unit 51 is further configured to stop the network switching if the operator of the network currently accessed by the processing unit 51 is the same as the target operator.

This embodiment of the present invention provides a terminal device. The terminal receives a user instruction, and then determines, according to the user instruction, whether an operator of a currently accessed network is the same as a target operator in the user instruction; if the operator of the currently accessed network is the same as the target operator in the user instruction, the terminal obtains a target image file of the target operator from a preset file, and then performs version switching according to the target image file to access a target network according to the switched target image file. In this way, versions of a plurality of operators are stored effectively, and efficiency in identifying and switching an operator version is improved.

Figure 7:
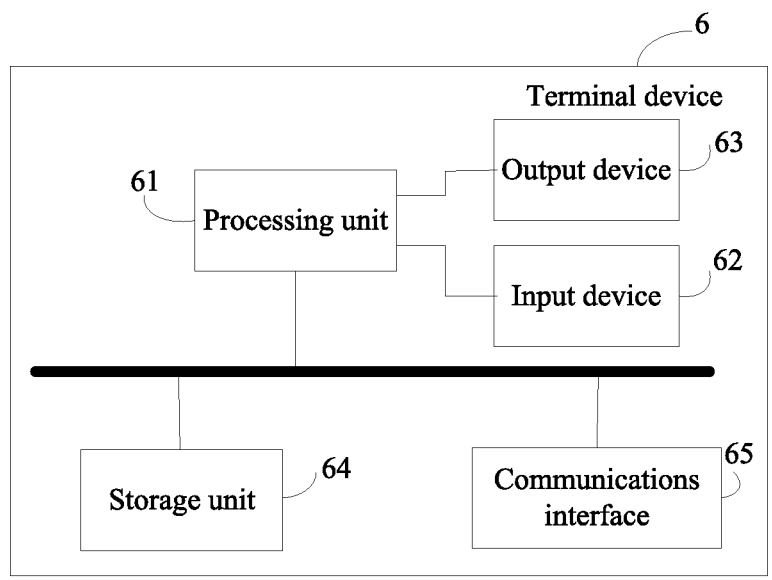
FIG. 7 is a schematic apparatus diagram of another terminal device according to another embodiment of the present invention.

FIG. 7 is a schematic structural diagram of a terminal device according to another embodiment of the present invention. The terminal device may be a terminal product board, that is, an electronic device that can be inserted into a subrack to provide various uplink or service ports; the terminal product board is composed of a chip and electronic components. The terminal device includes a processing unit 61, an input device 62, an output device 63, a storage device 64, and a communications interface 65, where all the components are coupled together by using a bus system. The bus may be an Industry Standard Architecture (Industry Standard Architecture, ISA for short) bus, a Peripheral Component Interconnect (PCI for short) bus or an Extended Industry Standard Architecture (EISA for short) bus, and the like. The bus may be classified into an address bus, a data bus, a control bus, and the like. For the convenience of representation, the bus in FIG. 7 is represented by using one piece of solid line only, but it does not mean that there is only one piece of bus or one type of bus. In FIG. 7:

The processing unit 61 may be a universal central processing unit (CPU for short), an application specific integrated circuit (ASIC for short), a digital signal processor (DSP), a field programmable gate array (FPGA) or other programmable logical devices. The input device and the output device can implement input and output by using a USB (universal serial bus).

The storage device 64 includes but is not limited to common storage media in this field like a read only memory (ROM for short), a random access memory (RAM for short), or a disk storage (disk storage), a flash memory, a programmable read only memory or an electrically erasable and programmable memory, and a register. The storage device 64 is configured to provide the processing unit 61 with an instruction and data information, and connect to the processing unit 61 by using a bus.

The storage device 64 stores program code of an operating system, an application and so on that are used to implement this embodiment of the present invention. The operating system is configured to control and implement processing functions executed by the processing unit 61. The applications include the program code.

The program code used to implement this embodiment of the present invention is coupled with the processing unit 61 to implement the version upgrade method provided by this embodiment of the present invention.

The processing unit 61 further includes a communications interface 65, where the communications interface 65 is configured to connect to a terminal device and a user equipment, and the communications network includes an Ethernet, a radio access network (RAN), a wireless local area network (WLAN) or other similar networks. The processing unit 61 processes and transfers message between all devices by reading information stored in the storage device 64 to: receive a first data packet, where the first data packet carries first image information; read a preset file, and determine, according to the first image information carried by the first data packet, whether an image file stored in the terminal requires a version upgrade, where the preset file includes image information that corresponds to all image files of operators stored in the terminal device in one-to-one correspondence; if the version upgrade is required, receive remaining data packets until an image file corresponding to the first image information is received completely to finish version upgrade, where the image file corresponding to the first image information is composed of the first data packet and the remaining data packets.

Optionally, the image information includes operator information and version information.

The processing module 61 is further configured to: if version information of the first image information is later than version information of second image information in the preset file, determine that the image file stored in the terminal requires a version upgrade, where the second image information is a piece of image information that is the same as operator information of the first image information and that is one of the image information that corresponds to all image files stored in the terminal in one-to-one correspondence; otherwise, stop the version upgrade The terminal device provided in this embodiment enables OEM manufacturers to reuse their existing upgrade tools to package image version files of operators into an upgrade file of a file system, and upgrade the upgrade file in the system by using the same tools, which improves efficiency in upgrading image versions of a plurality of operators.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program codes, such as a ROM, a RAM, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network switching method, comprising:
searching for currently available operators by a terminal having an image partition for a single image file and a file management area managed by a file system;
reporting, by the terminal, found operators to a user;
receiving, by the terminal, a user instruction that instructs the terminal to access a network of a target operator selected from the found operators; and
performing, when an operator of a network currently accessed by the terminal is different from the target operator:
reading a preset file stored in the file management area to obtain image information corresponding to the target operator, wherein the preset file is a single file and stores, without space reserved for bad block management and in a form of a directory and table, a plurality of image files corresponding to operators and image information that is separate from the image information and that corresponds to each image file of the plurality of image files in a one-to-one correspondence, wherein the image information comprises operator information and configuration parameters for each image file of the plurality of image files;

obtaining, according to the operator information of the image information, from the plurality of image files stored in the preset file, a target image file corresponding to the target operator indicated by the user instruction;

performing version switching according to the target image file by switching the target image file into the single image partition; and switching to the network of the operator using the target image file and according to the configuration parameters.

2. The method according to claim 1, wherein obtaining the target image file, performing version switching, and switching to the network of the operator comprises:

selecting, from all the image files stored in the terminal, the target image file consistent with the operator information of the target operator;

restarting the terminal;

loading the target image file;

initializing the terminal according to the configuration parameters in the target image file; and registering the terminal with the network of the target operator.

3. The method according to claim 1, wherein the method further comprises stopping the network switching when the operator of the network currently accessed by the terminal is the same as the target operator.

4. A version upgrade method, comprising:

receiving, by a terminal, a first data packet, wherein the first data packet carries first image information data and the terminal has an image partition for a single image file and a file management area managed by a file system;

reading, by the terminal, a preset file stored in the file management area, wherein the preset file is a single file and stores, without space reserved for bad block management and in a form of a directory and table, a plurality of image files corresponding to operators and image information that is separate from the image information and that corresponds to each image file of the plurality of image files in a one-to-one correspondence, wherein the image information comprises operator information and configuration parameters for each image file of the plurality of image files;

determining whether an image file in the plurality of image files stored in the preset file stored in the terminal requires a version upgrade according to the first image information data carried by the first data packet, wherein the image file is selected according to operator information in the first image information data and the operator information in the image information;

performing, when the version upgrade is required:

receiving, by the terminal, remaining data packets until an image file corresponding to the first image information data is received completely to finish the version upgrade; and replacing the image file corresponding to second image information data in the preset file by storing, after the image file corresponding to the first image information data is completely received, the image file corresponding to the first image information data at a position in the preset file in which an image file corresponding to the second image information is stored, the replacing the image file comprising modifying the image information to include the first image information data;

wherein the image file corresponding to the first image information data is composed of the first data packet and remaining data packets.

5. The method according to claim 4, wherein determining whether the image file stored in the terminal requires the version upgrade comprises:

when version information of the first image information data is later than version information of the second image information data in the preset file, determining that the version upgrade is required, wherein the second image information data is a piece of image information that is the same as operator information of the first image information data and that is one of the image information that corresponds to all image files stored in the terminal in one-to-one correspondence; and when version information of the first image information data is not later than version information of second image information data in the preset file, stopping the version upgrade.

6. The method according to claim 4, wherein the first data packet is the first 4K data of the image file corresponding to the first image information data.

7. A terminal device, comprising:

a processing unit; and a storage device;

wherein the storage device is configured to provide the processing unit with an instruction and data information and wherein the terminal device has an image partition for a single image file and a file management area managed by a file system;

wherein the processing unit is configured to:

cause the terminal device to search for currently available operators;

report found operators to a user;

receive a user instruction that instructs the terminal device to access a network of a target operator selected from the found operators; and perform, when an operator of a network currently accessed by the terminal device is different from the target operator:

read a preset file stored in the file management area to obtain image information corresponding to the target operator, wherein the preset file is a single file and stores, without space reserved for bad block management and in a form of a directory and table, a plurality of image files corresponding to operators and image information that is separate from the image information and that corresponds to each image file of the plurality of image files in a one-to-one correspondence, wherein the image information comprises operator information and configuration parameters for each image file of the plurality of image files;

obtain a target image file corresponding to the target operator indicated by the user instruction and according to the operator information of the image information and from the plurality of image files stored in the preset file;

perform version switching according to the target image file; and switch to the network of the operator by switching the target image file into the single image partition and execute the target image file using the target image file and the configuration parameters in the image information.

8. The terminal device according to claim 7, wherein:
the image information comprises operator information and configuration parameters; and
the processing unit is configured to select, from all the image files stored in the terminal device, the target image file consistent with operator information of the target operator, to restart the terminal device and load the target image file; and to initialize, according to configuration parameters in the target image file, the terminal device and register with the network of the target operator.

9. The terminal device according to claim 7, wherein the processing unit is further configured to stop the network switching when the operator of the network currently accessed by the terminal device is the same as the target operator.

10. A terminal device, comprising:
a processing unit; and
a storage device;
wherein the storage device is configured to provide the processing unit with an instruction and data information and wherein the terminal has an image partition for a single image file and a file management area managed by a file system;
wherein the processing unit is configured to:
receive a first data packet and read a preset file, wherein the first data packet carries first image information data;
determine, according to the first image information data carried by the first data packet, whether an image file that is in a plurality of image files corresponding to operators that is stored in the preset file stored in the terminal device requires a version upgrade, wherein the image information comprises operator information and configuration parameters for each image file of the plurality of image files, wherein the image file is selected according to operator information in the first image information data and the operator information in the image information, wherein the preset file is a single file and is stored in the file management area and stores, in a form of a directory and table and without space reserved for bad block management, the plurality of image files and image information that is separate from the plurality of image files and that corresponds to each of the plurality of image files stored in the terminal device in one-to-one correspondence; and
perform, when determining that the image file stored in the terminal requires a version upgrade:
receive remaining data packets until an image file corresponding to the first image information data is received completely to finish the version upgrade; and
replace the image file corresponding to second image information data in the preset file by storing, after the image file corresponding to the first image information data is completely received, the image file corresponding to the first image information data at a position in the preset file in which an image file corresponding to the second image information data is stored, the replacing the image file comprising modifying the image information to include the first image information data;
wherein the image file corresponding to the first image information data is composed of the first data packet and remaining data packets.

11. The terminal device according to claim 10, wherein the image information comprises operator information and version information; and
wherein the processing unit is specifically configured to:
when the version information of the first image information data is later than version information of the second image information data in the preset file, determine that the version upgrade is required, wherein the second image information data is a piece of image information that is the same as operator information of the first image information data and that is one of the image information that corresponds to all image files stored in the terminal device in one-to-one correspondence; and
when the version information of the first image information data is not later than the version information of second image information data in the preset file, stop the version upgrade.

12. The terminal device according to claim 10, wherein the first data packet is the first 4K data of the image file corresponding to the first image information data.

13. The method according to claim 1, wherein the operator information includes a version number of a respective operator, an image type of the respective image, a name of the operator, and a code identifier corresponding to the respective operator, and wherein the configuration parameters include data used to initialize the terminal and register the terminal with a target network.

14. The method according to claim 4, wherein the operator information includes a version number of a respective operator, an image type of the respective image, a name of the operator, and a code identifier corresponding to the respective operator, and wherein the configuration parameters include data used to initialize the terminal and register the terminal with a target network.

15. The terminal device according to claim 7, wherein the operator information includes a version number of a respective operator, an image type of the respective image, a name of the operator, and a code identifier corresponding to the respective operator, and wherein the configuration parameters include data used to initialize the terminal and register the terminal with a target network.

16. The terminal device according to claim 10, wherein the operator information includes a version number of a respective operator, an image type of the respective image, a name of the operator, and a code identifier corresponding to the respective operator, and wherein the configuration parameters include data used to initialize the terminal and register the terminal with a target network.

* * * * *